(12) United States Patent
Miyatake et al.

(10) Patent No.: US 7,957,096 B2
(45) Date of Patent: Jun. 7, 2011

(54) PERPENDICULAR MAGNETIC RECORDING HEAD AND METHOD OF MANUFACTURING SAME

(75) Inventors: Akira Miyatake, Tokyo (JP); Kiyoshi Kobayashi, Tokyo (JP); Shuji Maekawa, Tokyo (JP); Tomoo Otsuka, Tokyo (JP); Hideyuki Nakano, Tokyo (JP)

(73) Assignee: TDK Corporation, Tokyo (JP)

(*) Notice: Subject to any disclaimer, the term of this patent is extended or adjusted under 35 U.S.C. 154(b) by 560 days.

(21) Appl. No.: 12/130,209

(22) Filed: May 30, 2008

(65) Prior Publication Data

US 2008/0304179 A1    Dec. 11, 2008

(30) Foreign Application Priority Data

Jun. 5, 2007 (JP) .................................. 2007-148935

(51) Int. Cl.
*G11B 5/31* (2006.01)
*G11B 5/127* (2006.01)
*G11B 5/187* (2006.01)

(52) U.S. Cl. ................................................. 360/125.02

(58) Field of Classification Search ............ 360/125.02, 360/125.16, 125.17, 125.27, 125.29, 125.3, 360/125.42, 125.55, 123.02, 123.26, 123.47
See application file for complete search history.

(56) References Cited

U.S. PATENT DOCUMENTS

| | | | | |
|---|---|---|---|---|
| 6,657,816 B1* | 12/2003 | Barr et al. | ................. | 360/125.57 |
| 7,307,814 B1* | 12/2007 | Seagle et al. | ............. | 360/125.42 |
| 7,365,942 B2* | 4/2008 | Sasaki et al. | ............. | 360/125.02 |
| 7,375,925 B2* | 5/2008 | Sasaki et al. | ............. | 360/123.02 |
| 7,468,862 B2* | 12/2008 | Sasaki et al. | ............. | 360/125.02 |
| 7,633,714 B2* | 12/2009 | Sasaki et al. | ............. | 360/125.3 |
| 7,835,111 B2* | 11/2010 | Flint et al. | ............. | 360/125.16 |
| 2003/0058583 A1* | 3/2003 | Lam et al. | ..................... | 360/317 |
| 2007/0139819 A1* | 6/2007 | Yazawa et al. | ................ | 360/126 |

FOREIGN PATENT DOCUMENTS

| JP | A-2002-352402 | 12/2002 |
|---|---|---|
| JP | A-2004-318949 | 11/2004 |

* cited by examiner

*Primary Examiner* — Angel A. Castro
(74) *Attorney, Agent, or Firm* — Oliff & Berridge, PLC

(57) ABSTRACT

In a perpendicular magnetic recording head comprising a main magnetic pole layer and a return yoke layer which are laminated with a magnetic gap layer interposed therebetween, a nonmagnetic throat height determining layer and a return yoke reinforcement layer made of a magnetic material having a saturated magnetic flux density higher than that of the return yoke layer are provided on the magnetic gap layer. The nonmagnetic throat height determining layer has a front end face parallel to the medium-opposing surface at a position retracted by a desirable throat height from the medium-opposing surface. The return yoke reinforcement layer is formed directly under the return yoke layer so as to extend at least from the front end face of the nonmagnetic throat height determining layer to the upper face thereof, and is exposed at the medium-opposing surface between the magnetic gap layer and return yoke layer.

7 Claims, 7 Drawing Sheets

PERPENDICULAR MAGNETIC RECORDING HEAD AND METHOD OF MANUFACTURING SAME

BACKGROUND OF THE INVENTION

1. Field of the Invention

The present invention relates to a perpendicular magnetic recording head which performs a recording action by applying a recording magnetic field perpendicularly to a recording medium plane, and a method of manufacturing the same.

2. Related Background Art

As is well-known, a perpendicular magnetic recording head has a main magnetic pole layer and a return yoke layer which are positioned with a predetermined distance therebetween on a surface (medium-opposing surface) opposing a recording medium, a nonmagnetic insulating layer interposed between the main magnetic pole layer and return yoke layer, and a recording coil arranged within the nonmagnetic insulating layer. The main magnetic pole layer and return yoke layer are magnetically coupled to each other on the deeper side in the height direction of the medium-opposing surface. When a recording magnetic field is induced between the main magnetic pole layer and return yoke layer upon energization of the recording coil, a leakage recording magnetic field occurs between the main magnetic pole layer and return yoke layer on the medium-opposing surface. This recording magnetic field perpendicularly enters a hard magnetic film of the recording medium from the front end face of the main magnetic pole layer exposed at the medium-opposing surface and returns to the return yoke layer through a soft magnetic film of the recording medium. This subjects the recording medium to magnetic recording at a part opposing the front end face of the main magnetic pole layer.

In such a perpendicular magnetic recording head, the size in the height direction (throat height) of the return yoke layer is an important parameter for improving recording performances, and thus is required to be defined appropriately. As disclosed in the Japanese Patent Application Laid-Open No. 2002-352402 and Japanese Patent Application Laid-Open No. 2004-318949, examples of methods for defining the throat height include a method of forming a positioning layer made of an organic resist material at a position yielding a desirable throat height retracted from the medium-opposing surface, and a method of forming a return yoke layer having a desirable throat height by plating, The latter method typically fills the deeper side in the height direction of the return yoke layer with an inorganic nonmagnetic insulating material layer and flattens the upper face of the nonmagnetic insulating material layer and the upper face of the return yoke layer by polishing.

SUMMARY OF THE INVENTION

However, reliability becomes a problem when defining the throat height by the positioning layer made of an organic resist material. This is because the coefficient of thermal expansion of the positioning layer is much higher than that of the return yoke layer and nonmagnetic insulating material positioned thereabout, so that the positioning layer thermally expands when the head operates, thereby deforming the end face in the height direction of the return yoke layer, which causes defects such as peeling of layers. Also, end parts of the positioning layer made of an organic resist material are rounded by heat treatment performed for enhancing its adhesion, thus lowering the dimensional accuracy of throat height. When the return yoke layer is formed by defining the throat height by plating, on the other hand, a plating foundation layer may adhere to the return yoke layer again at the time of removing an unnecessary part of the plating foundation layer, thereby deteriorating the dimensional accuracy of throat height. Since the flattening process using the nonmagnetic insulating material is necessary, the number of manufacturing steps and manufacturing cost increase, while it becomes harder to control the thickness of the return yoke layer.

The throat height has recently been defined very short, e.g., on the order of 100 to 200 nm, so that magnetic saturation may occur in the front end part of the return yoke layer exposed at the medium-opposing surface when the head operates, thereby deteriorating recording performances.

It is an object of the present invention to provide a perpendicular magnetic recording head which improves the dimensional accuracy of throat height, thereby achieving excellent recording performances and reliability, and a method of manufacturing the same.

Focusing attention on a nonmagnetic metal plating layer which is harder to expand and can maintain the perpendicularity of the front end face defining the throat height more favorably than resist materials, the present invention proposes to provide a return yoke reinforcement layer having a high saturated magnetic flux density from the front end face of the throat height determining layer made of a nonmagnetic metal plating layer to the upper face thereof, so as to define the throat height with a high accuracy and keep the return yoke layer from being magnetically saturated, thereby improving recording performances.

Namely, in one aspect, the present invention provides a perpendicular magnetic recording head comprising a main magnetic pole layer and a return yoke layer which are laminated with a magnetic gap layer interposed therebetween on a medium-opposing surface, the perpendicular magnetic recording head further comprising a nonmagnetic throat height determining layer, made of a nonmagnetic metal plating layer, having a front end face parallel to the medium-opposing surface at a position retracted from the medium-opposing surface to the deeper side in a height direction; and a return yoke reinforcement layer made of a magnetic material having a saturated magnetic flux density higher than that of the return yoke layer and formed directly under the return yoke layer so as to extend at least from the front end face of the nonmagnetic throat height determining layer to an upper face thereof; wherein the return yoke reinforcement layer is exposed at the medium-opposing surface between the magnetic gap layer and return yoke layer.

The return yoke reinforcement layer has a size in the thickness direction at the medium-opposing surface greater than that of the nonmagnetic throat height determining layer in the thickness direction. When the return yoke layer is made of a plating layer, the return yoke reinforcement layer is also used as a plating foundation layer of the return yoke layer.

The nonmagnetic plating foundation layer is formed directly under the nonmagnetic throat height determining layer. The nonmagnetic plating foundation layer may be either positioned directly under the nonmagnetic throat height determining layer alone or extend from the position directly under the nonmagnetic throat height determining layer to the medium-opposing surface, When extended to the medium-opposing surface, the nomnagnetic plating foundation layer constitutes a part of the magnetic gap layer. It will be practical if the nonmagnetic throat height determining layer is formed by NiP or NiPRe.

In another aspect, the present invention provides a method of manufacturing a perpendicular magnetic recording head comprising a main magnetic pole layer and a return yoke layer which are laminated with a magnetic gap layer interposed therebetween on a surface opposing a recording medium, the method comprising the steps of forming a nonmagnetic throat height determining layer on the magnetic gap layer by plating with a nonmagnetic metal material, the throat height determining layer having a front end face parallel to the medium-opposing surface at a position retracted by a desirable throat height from the medium-opposing surface to the deeper side in a height direction; forming a return yoke reinforcement layer made of a magnetic material having a saturated magnetic flux density higher than that of the return yoke layer so as to cover the front end face of the nonmagnetic throat height determining layer and extend over the magnetic gap layer and the nonmagnetic throat height determining layer; forming the return yoke layer on the return yoke reinforcement layer; and carrying out polishing for forming the medium-opposing surface, so as to expose the return yoke reinforcement layer at the medium-opposing surface between the magnetic gap layer and return yoke layer. Preferably, in this method, the nonmagnetic throat height determining layer is formed by plating on a nonmagnetic plating foundation layer formed on the magnetic gap layer, while a part of the magnetic gap layer is formed by the nonmagnetic plating foundation layer extending on the medium-opposing surface side of the nonmagnetic throat height determining layer.

Since the throat height is defined by the front end face parallel to the medium-opposing surface of the nonmagnetic throat height determining layer made of a nonmagnetic metal plating layer in the present invention, the dimensional accuracy of throat height improves, which can prevent the return yoke layer from deforming and chipping because of thermal stresses. Since the return yoke reinforcement layer formed so as to extend from the front end face of the nonmagnetic throat height determining layer to the upper face thereof is exposed at the medium-opposing surface between the return yoke layer and magnetic gap layer, the return yoke layer is hard to be magnetically saturated, whereby recording performances improve. This yields a perpendicular magnetic recording head improving the dimensional accuracy of throat height, thereby achieving excellent recording performances and reliability, and a method of manufacturing the same.

DESCRIPTION OF THE PREFERRED EMBODIMENTS

In the following, the present invention will be explained with reference to the drawings. In each drawing, X, Y, and Z directions are defined by the track width direction, the height direction, and the moving direction of a recording medium M, respectively.

Figure 1:
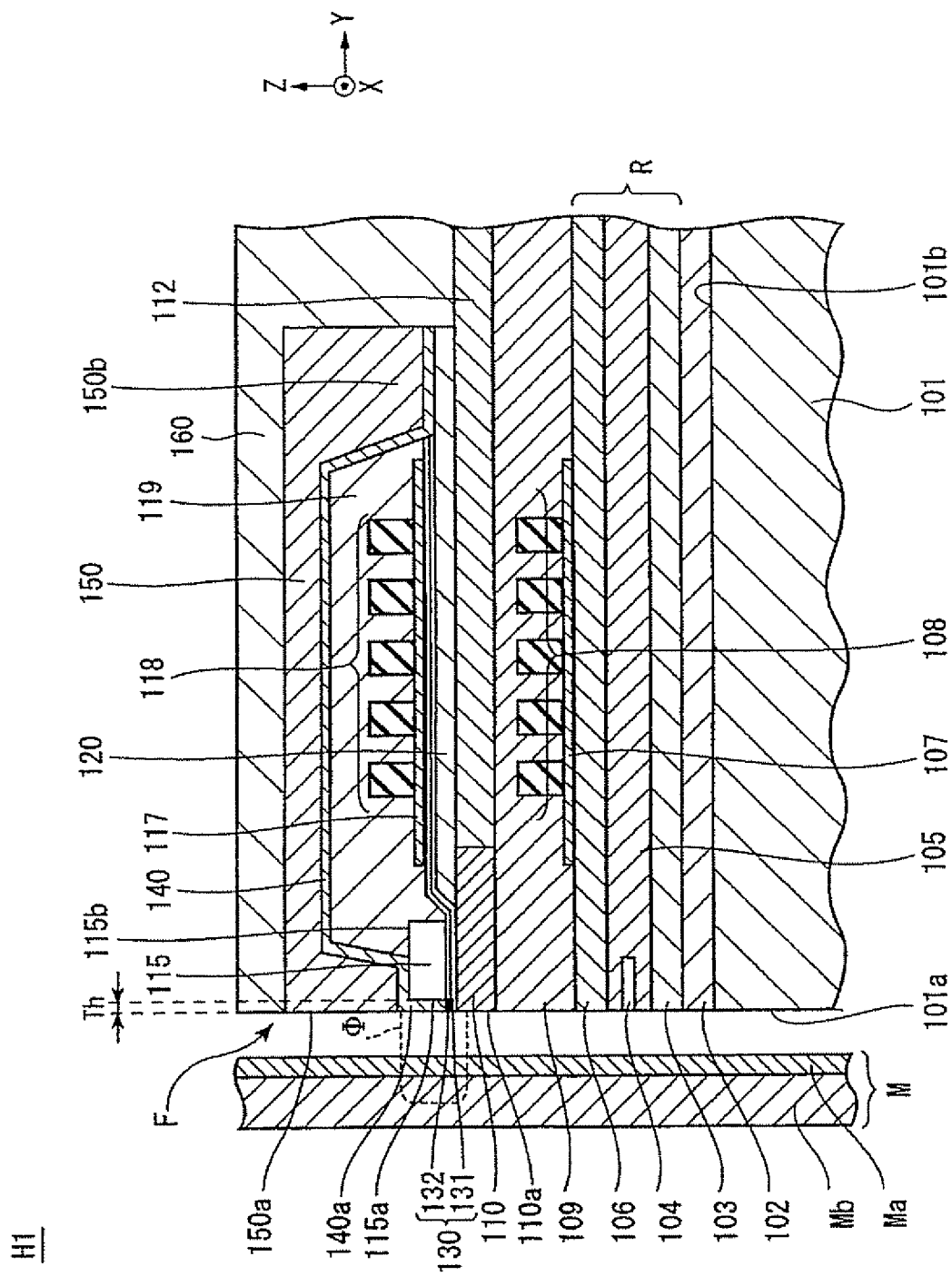
FIG. 1 is a sectional view showing the overall structure of the perpendicular magnetic recording head in accordance with the present invention.

FIG. 1 is a partial sectional view showing the overall structure of the perpendicular magnetic recording head H1 in accordance with an embodiment of the present invention. The perpendicular magnetic recording head H1 provides the recording medium M with a recording magnetic field $\Phi$ perpendicular thereto, thereby perpendicularly magnetizing a hard magnetic film Ma of the recording medium M. The recording medium M has the hard magnetic film Ma with a higher remanent magnetization on the medium surface side and a soft magnetic film Mb with a higher magnetic permeability on the inner side of the hard magnetic film Ma. The recording medium M is shaped like a disk, for example, and rotated about the center of the disk as a rotary axis. A slider 101 is formed by a nonmagnetic material such as $Al_2O_3.TiC$. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reproducing part R is formed on the nonmagnetic insulating layer 102. The reproducing part R has a lower shield layer 103, an upper shield layer 106, an inorganic insulating layer (gap insulating layer) 105 filling the gap between the lower and upper shield layers 103, 106, and a reproducing device 104 positioned within the inorganic insulating layer 105. The reproducing device 104 is a magnetoresistive device such as AMR, GMR, or TMR.

By way of a coil insulating foundation layer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. An undepicted plating foundation layer is formed on the flat surface, while a main magnetic pole layer 110 made of a ferromagnetic material having a high saturated magnetic flux density such as Ni—Fe, Co—Fe, or Ni—Fe—Co is formed on the plating foundation layer. The main magnetic pole layer 110 has a front end face 110a exposed at the medium-opposing surface F. The size of the front end face 110a in the depicted X direction is defined by a writing track width. The main magnetic pole layer 110 in this embodiment is not formed totally on the coil insulating layer 109 but locally on only the medium-opposing surface F side, and is magnetically coupled to an auxiliary yoke layer 120 on the deeper side in the height direction. The auxiliary yoke layer 120 is made of a magnetic material having a saturated magnetic flux density lower than that of the main magnetic pole layer 110, and transmits magnetic fluxes generated by the recording coil (first and second coil layers 108, 118) to the main magnetic pole layer 110. Though laminated on the main magnetic pole layer 110 in FIG. 1, the auxiliary yoke layer 120 may be laminated under the main magnetic pole layer 110 as well. A nonmagnetic material layer 112 is formed about the main magnetic pole layer 110 and made flat such that the upper face of the main magnetic pole layer 110 and the upper face of the nonmagnetic material layer 112 are flush with each other.

A magnetic gap layer 130 made of an inorganic nonmagnetic insulating material such as $Al_2O_3$ or $SiO_2$, for example, is formed on the main magnetic pole layer 110 and auxiliary yoke layer 120 by a thickness corresponding to a predetermined gap distance. The magnetic gap layer 130 has a two-layer structure constituted by a nonmagnetic material layer 131 and a nonmagnetic plating foundation layer 132, while its thickness is about 50 nm at present. On the magnetic gap layer 130, the second coil layer 118 is formed on the deeper side in the height direction by way of a coil insulating foundation layer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nonmagnetic metal materials are laminated. The first and second coil layers 108, 118 are electrically connected to each other at their end parts in the track width direction (depicted X direction) so as form a solenoid. The form of coil layers is not limited to the solenoid in particular, though. A coil insulating layer 119 is formed about the second coil layer 118.

The return yoke layer 150 opposes the main magnetic pole layer 110 with a predetermined distance therebetween at the front end face 150a exposed at the medium-opposing surface F, and is connected to the main magnetic pole layer 110 at a junction 150b positioned on the deeper side in the height direction of the front end face 150a. The return yoke layer 150 is covered with a protecting layer 160 made of an inorganic nonmagnetic insulating material.

Figure 2:
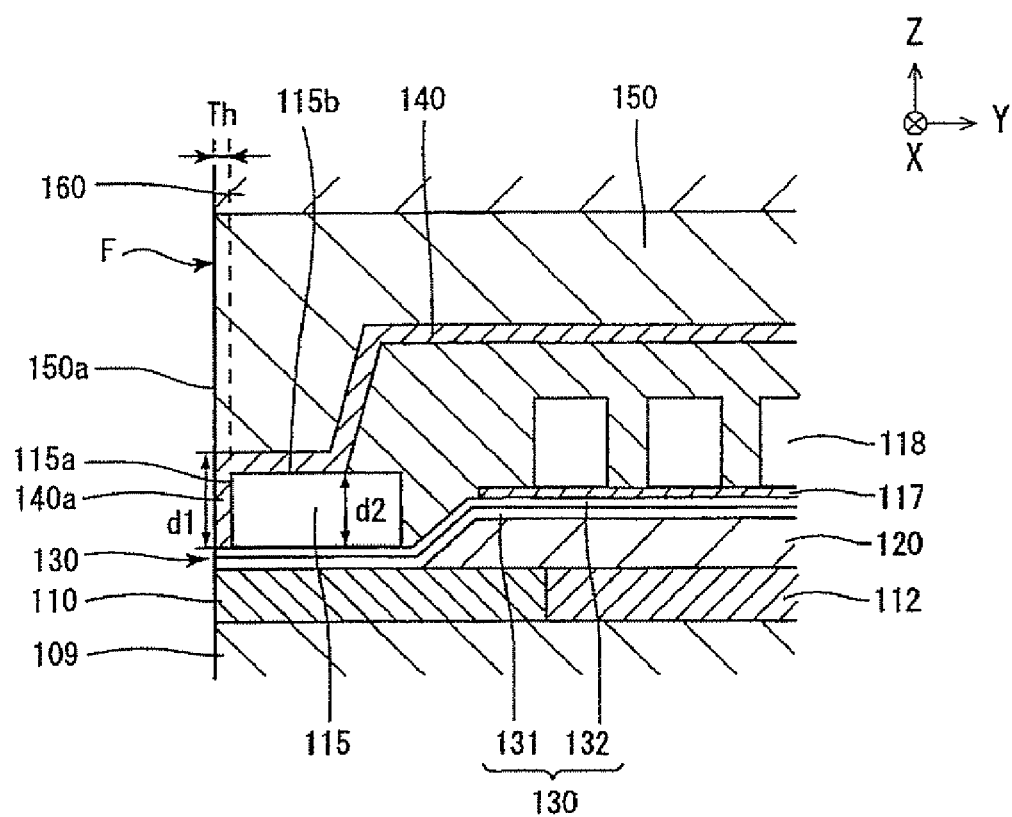
FIG. 2 is an enlarged sectional view showing the throat part and its vicinity in FIG. 1 under magnification.
Figure 3:
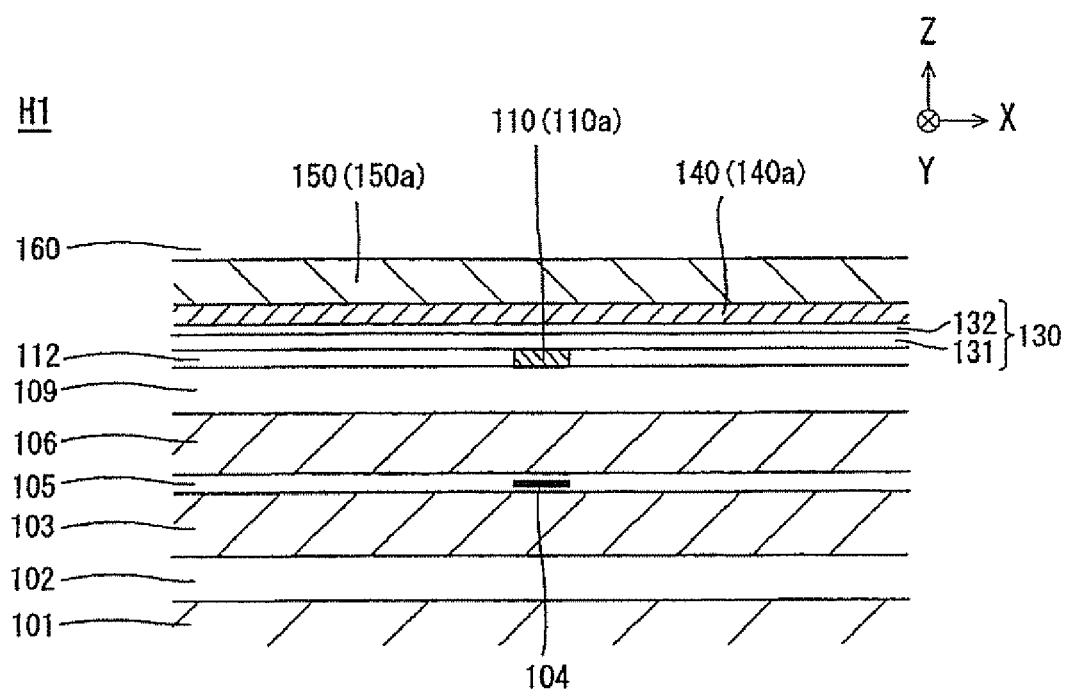
FIG. 3 is a sectional view showing the perpendicular magnetic recording head of FIG. 1 as seen from the medium-opposing surface side.

The perpendicular magnetic recording head H1 having the foregoing overall structure further comprises a nonmagnetic throat height determining layer 115 arranged on the deeper side in the height direction of the medium-opposing surface F and a return yoke reinforcement layer 140 exposed at the medium-opposing surface F. FIG. 2 is a sectional view showing the throat part and its vicinity (the magnetic gap layer 130, nonmagnetic throat height determining layer 115, return yoke reinforcement layer 140, and return yoke layer 150 in particular) under magnification. FIG. 3 is a sectional view showing the perpendicular magnetic recording head H1 as seen from the medium-opposing surface side.

The nonmagnetic throat height determining layer 115 is a nonmagnetic metal plating layer formed by plating with a nonmagnetic metal material such as NiP or NiPRe, for example, and exhibits a rectangular cross section having a front end face 115a parallel to the medium-opposing surface F at a position retracted by a desirable throat height Th from the medium-opposing surface F. In other words, the front end face 115a is an erected surface orthogonal to the upper face of the magnetic gap layer 130 and has such an excellent perpendicularity as to define the throat height position accurately. The nonmagnetic plating foundation layer 132, which is a plating foundation layer for the nonmagnetic throat height determining layer 115, is provided not only under the nonmagnetic throat height determining layer 115 but also from the medium-opposing surface F to the position directly under the second coil layer 118. The nonmagnetic plating foundation layer 132 is a part of the magnetic gap layer 130.

The return yoke reinforcement layer 140 is a magnetic film made of a ferromagnetic material having a saturated magnetic flux density higher than that of the return yoke layer 150, and is located directly below the return yoke layer 150, so as to act as a magnetic layer integrated with the return yoke layer 150. More specifically, the return yoke reinforcement layer 140 is formed on the magnetic gap layer 130 so as to extend from the front end face 115a of the nonmagnetic throat height determining layer 115 to the upper face 115b thereof and totally cover the coil insulating layer 119 from the upper face 115b of the nonmagnetic throat height determining layer 115, while the front end part 140a on the medium-opposing surface F side constitutes the throat part of the return yoke layer 150. Since the front end part 140a is formed along the front end face 115a of the nonmagnetic throat height determining layer 115 as mentioned above, its size d1 at the medium-opposing surface F in the thickness direction of the nonmagnetic throat height determining layer 115 is greater than the size d2 in the thickness direction of the nonmagnetic throat height determining layer 115. The size in the height direction of the front end part 140a is the throat height Th defined by the front end face 115a of the nonmagnetic throat height determining layer 115. The throat height Th is about 200 nm at present and expected to become shorter from now on. Even when the throat height Th is defined shorter as such, providing the return yoke reinforcement layer 140 (front end part 140a) having a high saturated magnetic flux density directly under the return yoke layer 150 and exposing it to the medium-opposing surface F can prevent the return yoke layer 150 from being magnetically saturated on the medium-opposing surface F side and improve recording performances. The return yoke layer 150 and return yoke reinforcement layer 140 in this embodiment are made of NiFe having a saturated magnetic flux density of about 1.1 (T) and FeCoNi having saturated magnetic flux density of about 1.8 (T), respectively. The return yoke reinforcement layer 140 is also used as the plating foundation layer of the return yoke layer 150 and is arranged in the whole area directly under the return yoke layer 150 in this embodiment, but may be provided separately from the plating foundation layer of the return yoke layer 150 as a matter of course. In the latter case, it will be sufficient if the return yoke reinforcement layer 140 extends at least from the front end face 115a to the upper face 115b thereof.

With reference to FIGS. 4 to 7, a method of manufacturing the perpendicular magnetic recording head H1 will now be explained. Here, steps of manufacturing the nonmagnetic throat height determining layer 115, magnetic gap layer 130, return yoke reinforcement layer 140, and return yoke layer 150, which are characteristic parts of the present invention, will be explained selectively, while omitting those of the other layers, which are formed by conventional methods.

Figure 4:
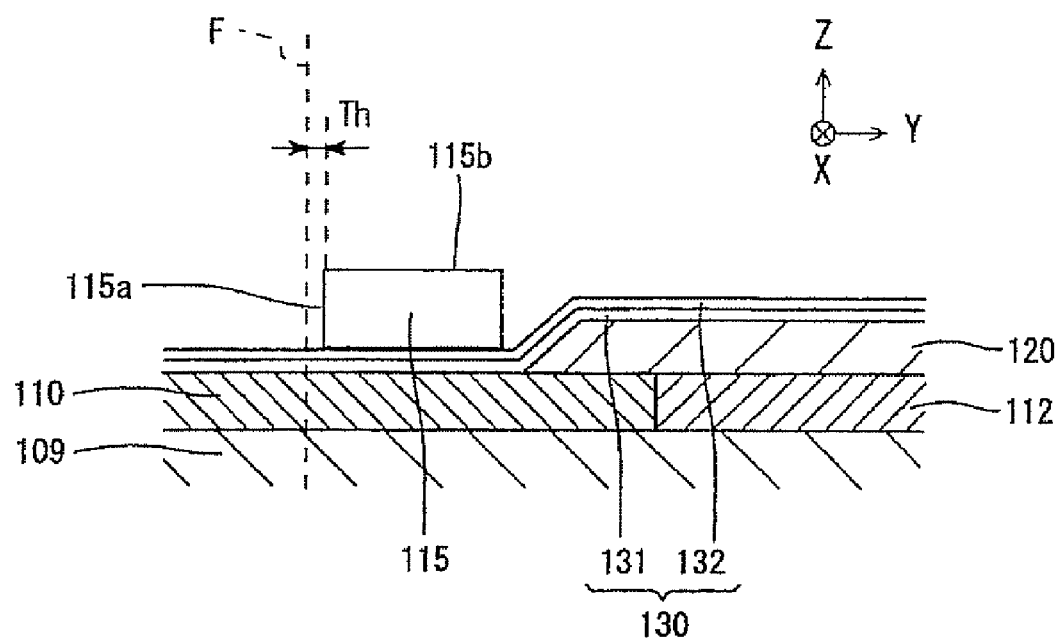
FIG. 4 is a sectional view showing a step in the method of manufacturing a perpendicular magnetic recording head in accordance with the present invention.

First, as shown in FIG. 4, the nonmagnetic material layer 131, which is the lower layer of the magnetic gap layer 130, is formed on the main magnetic pole layer 110 and auxiliary yoke layer 120, and the nonmagnetic plating foundation layer 132, which is the upper layer of the magnetic gap layer 130, is subsequently formed on the nonmagnetic material layer 131. Sputtering is used for forming these layers. The nonmagnetic material layer 131 is formed by an inorganic nonmagnetic insulating material such as $Al_2O_3$ or $SiO_2$, for example, while the nonmagnetic plating foundation layer 132 is formed by a nonmagnetic metal material such as Au, for example. The thickness of the nonmagnetic material layer 131 and the thickness of the nonmagnetic plating foundation layer 132 are set such that their total equals a desirable gap distance. Specifically, the gap distance is about 50 nm, while the respective thicknesses of the nonmagnetic material layer 131 and nonmagnetic plating foundation layer 132 are set to about 0 to 50 nm each. Namely, the magnetic gap layer 130 may be formed by the nonmagnetic plating foundation layer 132 alone, or the nonmagnetic material layer 131 alone by removing the nonmagnetic plating foundation layer 132 after forming the nonmagnetic throat height determining layer 115.

Next, as shown in FIG. 4, the nonmagnetic throat height determining layer 115 having the front end face 115a parallel to the medium-opposing surface F at a position retracted by a desirable throat height Th from a position to become the medium-opposing surface F to the deeper side in the height direction is formed on the nonmagnetic plating foundation layer 132. Here, the nonmagnetic throat height determining layer 115 is formed by plating with a nonmagnetic metal material such as NiP or NiPRe, for example. The perpendicularity of the front end face 115*a* can easily be secured by using a nonmagnetic metal material instead of resists and by plating. Though the nonmagnetic throat height determining layer 115 is formed such as to exhibit a rectangular cross section in this embodiment, the form of the nonmagnetic throat height determining layer 115 is not limited except for the front end face 115*a*.

After forming the nonmagnetic throat height determining layer 115, the nonmagnetic plating foundation layer 132 is left not only directly under the nonmagnetic throat height determining layer 115 but also in the remaining area, and the magnetic gap layer 130 is formed by the two layers consisting of the nonmagnetic plating foundation layer 132 and nonmagnetic material layer 131. When the nonmagnetic plating foundation layer 132 is left, the step of removing the nonmagnetic plating foundation layer 132 by ion milling is unnecessary, so that the nonmagnetic plating foundation layer 132 will not adhere to the front end face 115*a* of the nonmagnetic throat height determining layer 115 again, whereby the perpendicularity of the front end face 115*a* can be maintained favorably.

Figure 5:
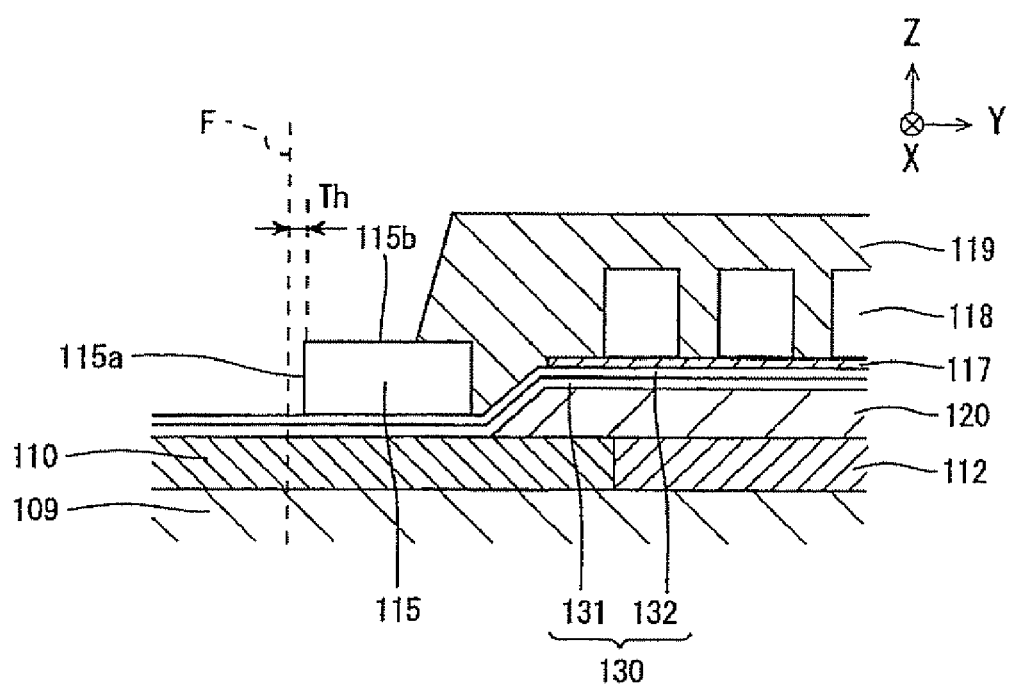
FIG. 5 is a sectional view showing a step subsequent to that of FIG. 4.

Further, as shown in FIG. 5, the coil insulating foundation layer 117, second coil layer 118, and coil insulating layer 119 are formed on the magnetic gap layer 130 (nonmagnetic plating foundation layer 132) such as to be positioned on the deeper side in the height direction of the nonmagnetic throat height determining layer 115.

Figure 6:
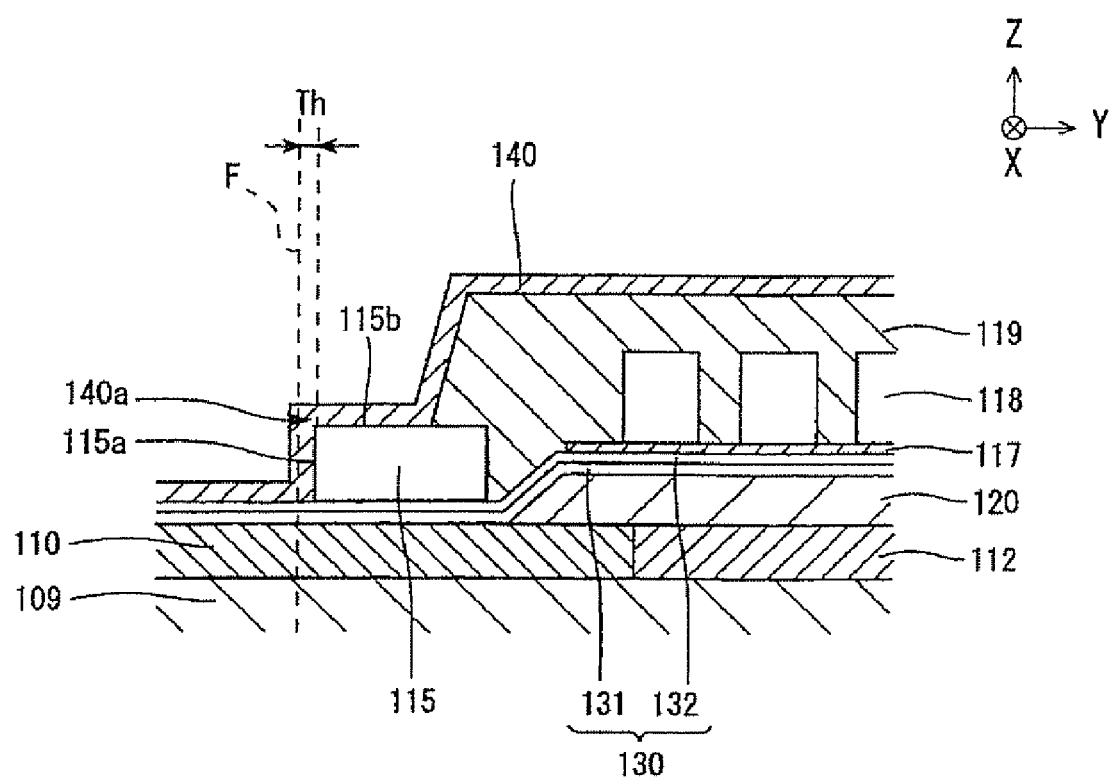
FIG. 6 is a sectional view showing a step subsequent to that of FIG. 5.

Subsequently, as shown in FIG. 6, the return yoke reinforcement layer 140 is formed so as to cover the upper face of the magnetic gap layer 130 (nonmagnetic plating foundation layer 132) exposed to the medium-opposing surface F side, the front end face 115*a* and upper face 115*b* of the nonmagnetic throat height determining layer 115, and the coil insulating layer 119. The return yoke reinforcement layer 140 is a layer functioning as a magnetic layer integrated with the return yoke layer formed in the next step, and is formed by using a ferromagnetic material having a saturated magnetic flux density higher than that of the return yoke layer. The return yoke reinforcement layer 140 can be formed by sputtering. In this embodiment, the return yoke reinforcement layer 140 is formed from FeCoNi by a thickness of about 200 nm. On the medium-opposing surface F side of the front end face 115*a*, the nonmagnetic throat height determining layer 115 is buried under the return yoke reinforcement layer 140.

Figure 7:
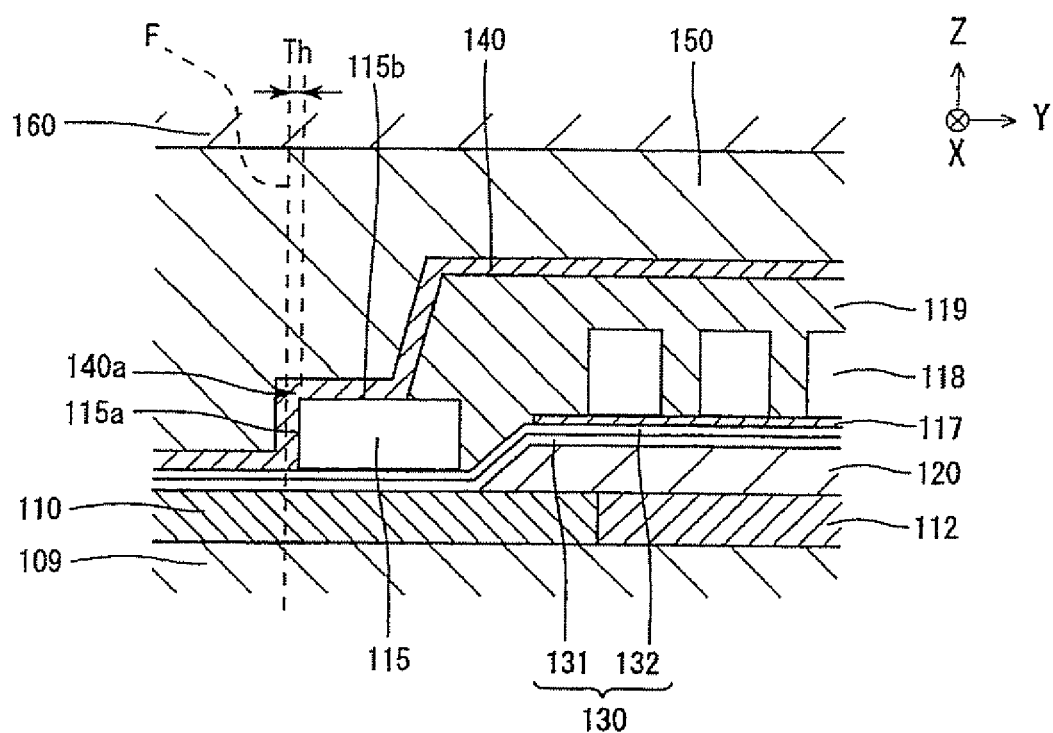
FIG. 7 is a sectional view showing a step subsequent to that of FIG. 6.

Next, as shown in FIG. 7, the return yoke layer 150 is formed by plating, while using the return yoke reinforcement layer 140 as a plating foundation layer. The return yoke layer 150 in this embodiment is formed by NiFe. As mentioned above, the return yoke layer 150 and return yoke reinforcement layer 140 form an integrated magnetic layer, the throat part contributing to recording actions is constituted by the front end part 140*a* of the return yoke reinforcement layer 140, and the size in the height direction of the throat part is defined as the throat height Th by the front end face 115*a* of the nonmagnetic throat height determining layer 115.

After forming the return yoke layer 150, the protecting layer 160 is formed so as to cover the return yoke layer 150 and its surroundings as shown in FIG. 7, and the end face side to become the medium-opposing surface F is mechanically polished, so as to form the medium-opposing surface F. As shown in FIG. 3, the magnetic gap layer 130, return yoke reinforcement layer 140, and return yoke layer 150 are exposed at the mediums-opposing surface F successively from the main magnetic pole layer 110 side.

The foregoing steps yield the perpendicular magnetic recording head H1 shown in FIGS. 1 to 3.

In this embodiment, as in the foregoing, the nonmagnetic throat height determining layer 115 made of a nonmagnetic metal plating layer is provided at a position retracted on the deeper side in the height direction from the medium-opposing surface F on the magnetic gap layer 130, while the throat height Th is defined by the front end face 115*a* parallel to the medium-opposing surface F of the nonmagnetic throat height determining layer 115. Therefore, the perpendicularity of the front end face 115*a* can be secured easily and favorably, while the throat height Th can be defined more accurately than by throat height determining layers made of resist materials. Even in a high-temperature environment at the time when the head operates and so forth, the nonmagnetic throat height determining layer 115 is hard to expand and thus applies no stress to the return yoke reinforcement layer 140 and return yoke layer 150, whereby the return yoke reinforcement layer 140 and return yoke layer 150 can be prevented from deforming and chipping.

In this embodiment, the return yoke reinforcement layer 140 made of a magnetic material having a saturated magnetic field density higher than that of the return yoke layer 150 is formed directly under the return yoke layer 150 from the front end face 115*a* of the nonmagnetic throat height determining layer 115 to the upper face 115*b* thereof. As a consequence, the return yoke reinforcement layer 140 is exposed at the medium-opposing surface F between the magnetic gap layer 130 and return yoke layer 150. Therefore, even when the throat height Th is defined short, the return yoke layer 150 can be prevented from being magnetically saturated on the medium-opposing surface F side, whereby recording performances can be improved.

What is claimed is:

1. A perpendicular magnetic recording head comprising a main magnetic pole layer and a return yoke layer, the main magnetic pole layer and the return yoke layer being laminated with a magnetic gap layer interposed therebetween on a medium-opposing surface, the perpendicular magnetic recording head further comprising:
   a nonmagnetic throat height determining layer, made of a nonmagnetic metal plating layer, having a front end face parallel to the medium-opposing surface at a position retracted from the medium-opposing surface to the deeper side in a height direction; and
   a return yoke reinforcement layer made of a magnetic material having a saturated magnetic flux density higher than that of the return yoke layer and formed directly under the return yoke layer so as to extend at least from the front end face of the nonmagnetic throat height determining layer to an upper face thereof;
   wherein the return yoke reinforcement layer is exposed at the medium-opposing surface between the magnetic gap layer and return yoke layer.

2. A perpendicular magnetic recording head according to claim 1, wherein the return yoke reinforcement layer has a size at the medium-opposing surface in a thickness direction of the nonmagnetic throat height determining layer greater than that of the nonmagnetic throat height determining layer in the thickness direction of the nonmagnetic throat height determining layer.

3. A perpendicular magnetic recording head according to claim 1, wherein the return yoke layer is made of a plating layer, the return yoke reinforcement layer being a plating foundation layer of the return yoke layer.

4. A perpendicular magnetic recording head according to claim 1, wherein a nonmagnetic plating foundation layer is formed directly under the nonmagnetic throat height determining layer, the nonmagnetic plating foundation layer extending to the medium-opposing surface and constituting a part of the magnetic gap layer.

5. A perpendicular magnetic recording head according to claim 1, wherein the nonmagnetic throat height determining layer is formed by NiP or NiPRe.

6. A method of manufacturing the perpendicular magnetic recording head according to claim 1, the method comprising the steps of:

forming a nonmagnetic throat height determining layer on the magnetic gap layer by plating with a nonmagnetic metal material, the throat height determining layer having a front end face parallel to the medium-opposing surface at a position retracted by a desirable throat height from the medium-opposing surface to the deeper side in a height direction;

forming a return yoke reinforcement layer made of a magnetic material having a saturated magnetic flux density higher than that of the return yoke layer so as to cover the front end face of the nonmagnetic throat height determining layer and extend over the magnetic gap layer and the nonmagnetic throat height determining layer;

forming the return yoke layer on the return yoke reinforcement layer; and carrying out polishing for forming the medium-opposing surface, so as to expose the return yoke reinforcement layer at the medium-opposing surface between the magnetic gap layer and return yoke layer.

7. A method of manufacturing a perpendicular magnetic recording head according to claim 6, wherein the nonmagnetic throat height determining layer is formed by plating on a nonmagnetic plating foundation layer formed on the magnetic gap layer, a part of the magnetic gap layer being formed by the nonmagnetic plating foundation layer extending on the medium-opposing surface side of the nonmagnetic throat height determining layer.

\* \* \* \* \*